(12) United States Patent
Ulm et al.

(10) Patent No.: US 7,955,422 B2
(45) Date of Patent: Jun. 7, 2011

(54) METHOD AND APPARATUS FOR SEPARATING FIBERS FROM A GAS IN A CENTRIFUGE

(75) Inventors: Dietmar Ulm, Breitenfurt (AT);
Anthony M. Riotto, Barnesville, PA (US)

(73) Assignee: Andritz Inc., Glens Falls, NY (US)

( * ) Notice: Subject to any disclaimer, the term of this patent is extended or adjusted under 35 U.S.C. 154(b) by 206 days.

(21) Appl. No.: 12/360,454

(22) Filed: Jan. 27, 2009

(65) Prior Publication Data

US 2009/0211439 A1 Aug. 27, 2009

Related U.S. Application Data

(60) Provisional application No. 61/031,848, filed on Feb. 27, 2008.

(51) Int. Cl.
*B01D 45/12* (2006.01)
(52) U.S. Cl. ............... 95/270; 55/396; 55/400; 55/406; 55/423; 55/437; 55/439
(58) Field of Classification Search .............. 95/270; 55/396, 400, 406, 408, 423, 437, 439
See application file for complete search history.

(56) References Cited

U.S. PATENT DOCUMENTS

| 2,367,906 | A | | 1/1945 | Wall et al. |
| 2,989,146 | A | | 6/1961 | Lundy |
| 4,253,857 | A | | 3/1981 | Fisher |
| 4,410,337 | A | * | 10/1983 | Gullichsen et al. ............. 95/22 |
| 5,711,789 | A | | 1/1998 | Elonen et al. |

FOREIGN PATENT DOCUMENTS

EP 0 552837 B1 5/1996

* cited by examiner

*Primary Examiner* — Robert A Hopkins
(74) *Attorney, Agent, or Firm* — Nixon & Vanderhye P.C.

(57) ABSTRACT

A separator for separating particulates from a gas stream including: a housing including a first cylindrical chamber defining a curved flow path for the gas stream passing through the separator and a second cylindrical chamber, wherein the first cylindrical chamber is adjacent the second cylindrical chamber and the chambers are separated by a dividing wall; a rotor assembly in the first cylindrical chamber; the first cylindrical chamber having an outer radial zone extending radially between the rotor assembly and the first cylindrical chamber; a flow inlet port to the first cylindrical chamber and a fiber outlet port to the first cylindrical chamber, wherein the inlet port and outlet port are each arranged aligned with the outer radial zone of the first chamber, and wherein the second cylindrical chamber is at a lower pressure such that gas from the gas stream is drawn through the gas passage.

19 Claims, 4 Drawing Sheets

METHOD AND APPARATUS FOR SEPARATING FIBERS FROM A GAS IN A CENTRIFUGE

CROSS RELATED APPLICATION

This application claims the benefit of U.S. Provisional Patent Application 61/031,848, filed Feb. 27, 2008, the entirety of which is incorporated by reference.

BACKGROUND OF THE INVENTION

This invention relates generally to the separation of solid particles entrained in a gas stream and, more particularly, relates to the separation of wood fibers entrained in steam so as to separate at least a portion of the steam from the remaining stream of fibers and steam.

In the manufacture of paper, wood chips are subjected to a chemical action or to a combination of mechanical and chemical action and reduced to fine fibers. Conventionally, these fibers are conveyed to a further processing station through a pipe at a velocity of between 5,000 and 30,000 feet per minute by means of steam.

When the fibers entrained in the steam flow arrive at the process station, it has been conventional to pass the entrainment of steam and fibers through a cyclone separator to separate the fiber from the steam. Alternatively, a fiber-steam separation centrifuge is described in U.S. Pat. No. 4,253,857, ('857 Patent) to separate wood fibers from steam. As described in the '857 Patent, fibers enter a housing of the centrifuge which includes a rotor in the housing. The rotor has blade tips that directly engage the fiber and steam flowing through the housing. Centrifugal forces applied by the rotor to the fibers tend to move the fibers to the outer perimeter of the housing and into a fiber discharge port of the housing. In contrast to the path of the fibers through the housing, the steam flowing through the housing is drawn towards the center of the rotor by suction created by a fan rotating in a separation chamber adjacent to the housing.

The fiber-steam separator of the type disclosed in the '857 Patent experienced difficulties due to the rubbing of the rotor blade tips against the housing and the accumulation of fibers in small voids between the edges of the rotor and the housing. Accordingly, there remains a long-felt need for an improved method and apparatus for separating fibers from steam in a stream of fibers and steam.

BRIEF DESCRIPTION OF THE INVENTION

A separator has been developed for separating particulates from a gas stream (such as wood fibers from a steam stream), the separator comprising: a housing including a first chamber defining a curved flow path for the gas stream passing through the separator; a rotor assembly in the first chamber; the chamber having an outer radial zone having an inner radial side defined by an outer radius of the rotor assembly and an outer radial side defined by an inside surface of the chamber; a flow inlet port to the first chamber and a fiber outlet port to the first chamber, wherein the inlet port and outlet port are each aligned with the outer radial zone of the first chamber, and a second chamber coupled to the first chamber by a gas passage, wherein the second chamber is at a lower pressure than the first chamber such that gas from the gas stream is drawn through the gas passage, wherein the opening to the gas passage in the first chamber is radially inward of the outer radial zone.

A separator has been developed for separating particulates from a gas stream including: a housing including a first cylindrical chamber defining a curved flow path for the gas stream passing through the separator and a second cylindrical chamber, wherein the first cylindrical chamber is adjacent the second cylindrical chamber and the chambers are separated by a dividing wall; a rotor assembly in the first cylindrical chamber; the first cylindrical chamber having an outer radial zone, wherein the zone extends radially between the rotor assembly and an inside surface of the first cylindrical chamber; a flow inlet port to the first cylindrical chamber and a fiber outlet port to the first cylindrical chamber, wherein the inlet port and outlet port are each arranged aligned with the outer radial zone of the first chamber, and wherein the second cylindrical chamber is at a lower pressure than the first cylindrical chamber such that gas from the gas stream is drawn through the gas passage, wherein the opening to the gas passage in the first cylindrical chamber is radially inward of the outer radial zone.

A method has been developed to separate particles from a gas stream, wherein the separator includes a housing including a first cylindrical chamber defining a curved flow path for the gas stream passing through the separator and a second chamber, wherein the first cylindrical chamber is adjacent the second chamber, the method comprising: introducing the gas stream to an outer radial zone of the first cylindrical chamber; generating a rotational gas flow in the first cylindrical chamber with a rotor assembly in the first cylindrical chamber, wherein the rotor assembly has an outer radial edge radially inward of the outer radial zone of the first cylindrical chamber; applying the rotational flow to move the gas stream through the outer radial zone and to applying centrifugal force to the particles in the gas stream to an outer radial periphery of the outer radial zone; discharging the fibers from the gas stream through a fiber outlet port in a perimeter wall of the first cylindrical chamber; drawing from the gas stream from the outer radial zone into an opening in the first cylindrical chamber, wherein the opening is radially inward of the outer radial zone.

DETAILED DESCRIPTION OF THE INVENTION

Figure 1:
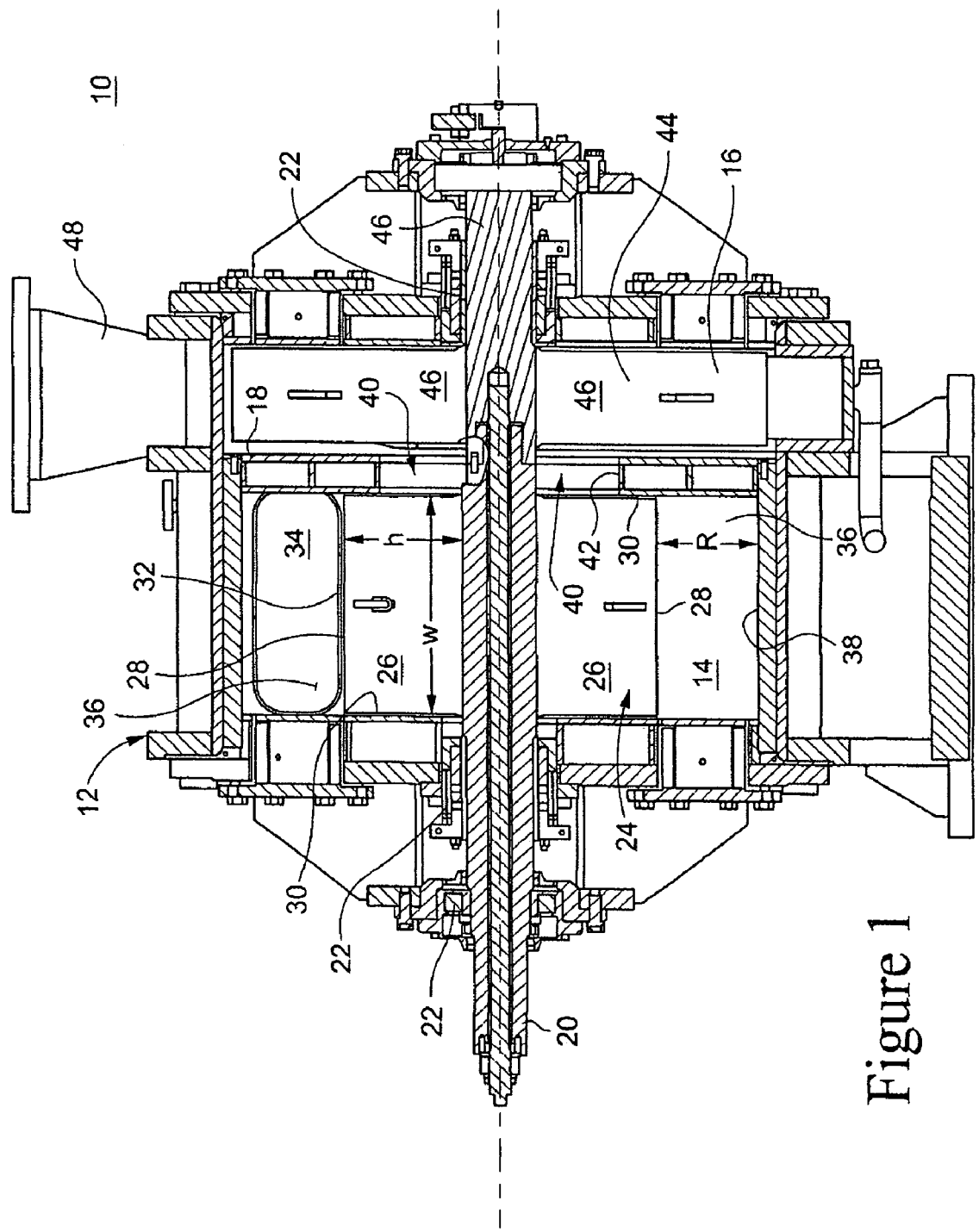
FIG. 1 is a cross-sectional diagram showing a side view of a fiber-steam centrifuge.

FIG. 1 is a side-view of a cross section of a fiber-steam centrifuge 10 having a main housing 12 that is generally cylindrical and includes a first cylindrical chamber 14 and a second cylindrical chamber 16. A circular sidewall 18 separates the chambers. A shaft assembly 20 extends through the center of the housing and is mounted on bearings 22 in the housing.

A small rotor assembly 24 is attached to the shaft, such as by being welded to the shaft. The small rotor assembly has rotor blades 26 that extend generally radially out from the shaft and partially into the first cylindrical chamber 14. The width of the blades 26 extends substantially the entire width (w) of the first chamber 14. As the blades rotate in the first chamber, the side edges of the blades are closely adjacent the sidewall 30 of the first chamber. There are preferably substantially no voids between the blade 26 side edges and the sidewall 30 of the first cylindrical chamber 14. The close proximity between the side edges of the blades and the chamber side walls prevent substantial build up of fibers on the sidewall and edges of the blades.

The tips 28 of the blades 26 extend partially into the first cylindrical chamber 14 and, preferably, do not extend radially past the radially inward edge 32 of the inlet port 34 to the housing 12. The blades do not extend into an outer radial zone 36 of the first chamber 14, wherein the 36 zone has an annular shape having a thickness (R) extending from the tip 28 of the blades to the inside wall 38 at the cylindrical perimeter of the first chamber. By way of example, the thickness (in a radial direction) of the outer radial zone 36 may be approximately equal to the height (h) of the blades 26 of the rotor. However, the thickness of the outer radial zone may be narrower or wider than the height of the blades depending on the design of the centrifuge 10.

The outer radial zone 36 is a substantially open annular volume in the first cylindrical chamber 14 which is radially outward of the rotor blades. Fibers flowing through the radial zone 36 are not directly impacted by the rotor blades and, thus, are not damaged or torn by the blades. The inlet port 34 opens directly to the outer radial zone 36 such that fibers and other particles may enter the zone without impinging on the rotor blades. Further, an end of a screw conveyor or other mechanism that is inserted, albeit inadvertently, through the inlet port 34 may extend into the radial zone 36 without causing damage to the rotor blades or the mechanism.

The rotation of the rotor blades 26 in the first cylindrical chamber 14 generates a rotational flow of the fibers and steam in the outer radial zone 36. The rotational flow of steam and fibers induced by the blades extends throughout the chamber 14, including in the outer annular zone 36. Rotational flow in the first cylindrical chamber 14 creates a partial suction at the inlet port 34 that draws fiber and steam into the outer radial zone 36. The velocity of the fiber and steam entering the inlet port 34 may provide additional motive force for the fiber and steam moving in a rotational direction through the first cylindrical chamber 14.

The rotational flow of fibers and steam in the first cylindrical chamber 14 applies centrifugal forces to the fibers in the flow that tends to push the fibers into the outer annular radial zone 36 and away from the rotor blades 26. Steam in the flow, which has less mass than the fibers, tends to be displaced radially inward in the cylindrical chamber 14 by the fibers. In addition, the steam, or at least a portion thereof, is drawn by suction to an opening 40 in the divider wall 18 between the first and second cylindrical chambers 14, 16. The opening 40 serves as a gas passage for the steam flowing from the first cylindrical chamber to the second cylindrical chamber. The opening 40 is preferably coaxial with the shaft 20 and extends substantially around the shaft. The opening may be an array of apertures in the dividing wall, a continuous annular aperture or an aperture extending only partially around the shaft. The opening 40 allows steam to be exhausted from the first cylindrical chamber 14 and flow into the second cylindrical chamber 16.

Fibers do not flow through the opening because the centrifugal force of the rotational flow in the first chamber 14 pushes the fiber to the outer annular zone 36 which is beyond the outer radial edge 42 of the annular opening 40. Because the opening 40 does not extend to the tips 28 of the rotor blades or into the outer radial zone 36 where the fiber is concentrated, there is no or little fiber that flows through the opening 40. The steam is separated from the flow of fiber by directing the steam through the opening 40.

A suction pressure to draw the steam through the opening 40 is created by a fan 44 rotating in the second cylindrical chamber 16. The blades 46 of the fan push steam and air in the second cylindrical chamber to gas outlet 48 extending along a tangent line to the second cylindrical chamber 16. The pressure in the second cylindrical chamber is decreased by the flow of steam and air being pushed by the fan out of that chamber. The decrease in pressure in the second cylindrical chamber creates a suction that draws steam through the opening 40 and out of the first cylindrical chamber. The fan blades 46 may extend substantially the entire width and radial height of the second cylindrical chamber.

The fan 44 is coaxial to and attached, e.g., by welding, to the shaft assembly 20. The fan, rotor assembly and shaft preferably rotate at the same rotational speed. It is preferred that the rotational speed of the shaft is by between 1800 revolutions per minute (RPM) and 1100 RPM, such as at 1500 RPM. These speeds are relatively slow, and are intended to cause the rotor assembly and fan to generate the rotational gas flows in their respective first cylindrical chamber and second cylindrical chamber. The rotation flow in the first cylindrical chamber is at an annular velocity sufficient to push the fibers to the inside perimeter wall 38 of the first cylindrical chamber.

Figure 2:
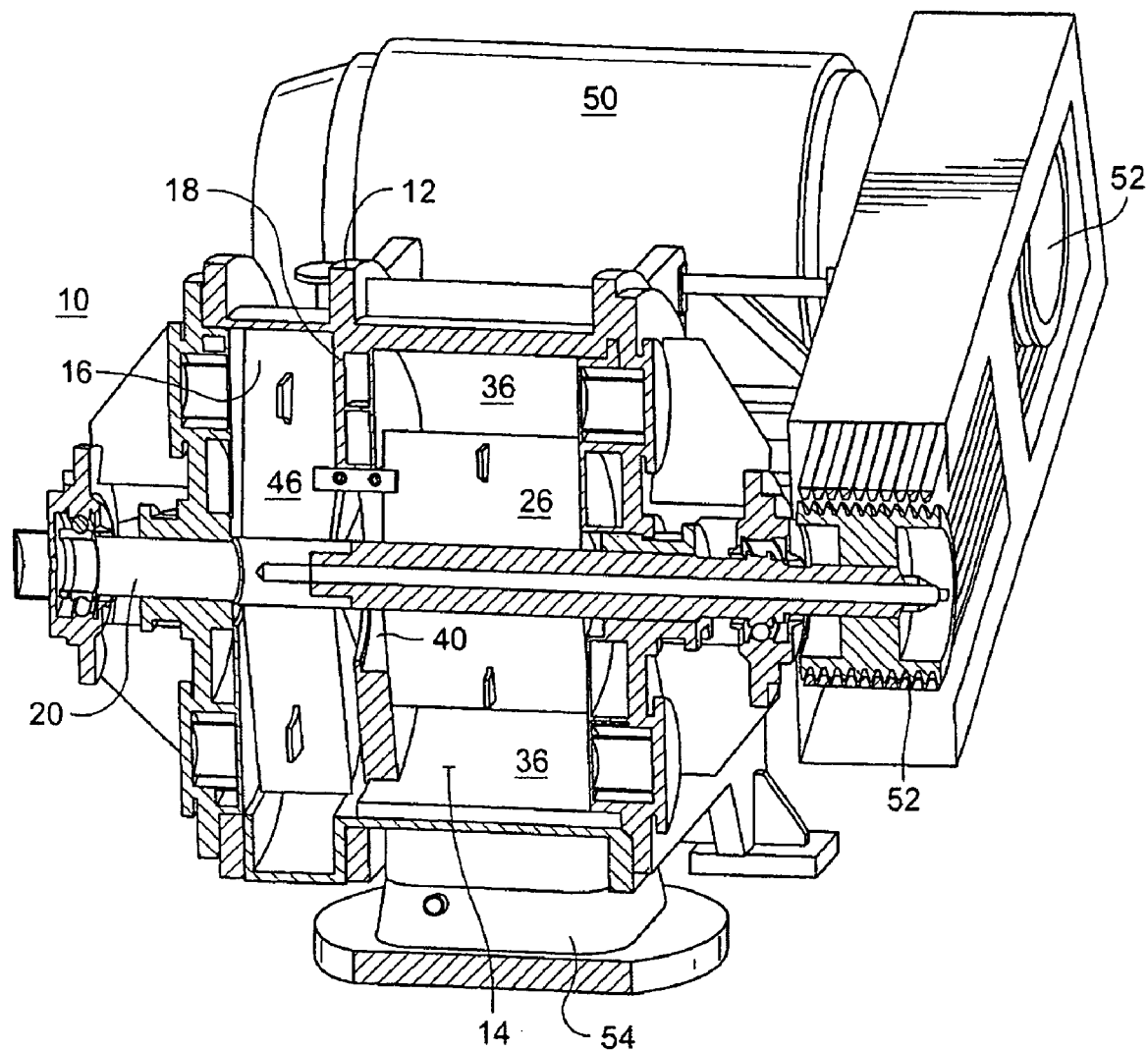
FIG. 2 is diagram showing a perspective view and a partial cross-section of the fiber-steam centrifuge.

FIG. 2 is a diagram of the fiber-steam centrifuge 10 showing the housing 12 in cross-section. The shaft is coupled to an electric motor 50 by a belt drive 52. The rotational speed of the rotor assembly, fan and shaft is determined by the belt drive and the motor.

A fiber outlet conduit 54 extends vertically downward from the bottom of the first cylindrical chamber 14. The fiber and a portion of the steam not drawn to the second chamber is exhausted through the fiber outlet conduit. Preferably, the fiber outlet conduit 54 extends out from the first cylindrical chamber along a line tangent to the first chamber 14. Further, the outlet conduit 54 is preferably offset from the inlet port 34 by approximately 90 degrees around the perimeter of the first cylindrical chamber 14. The fiber and steam flow enters the first cylindrical chamber 14 through the inlet port 34, moves through 90 degrees of the first cylindrical chamber, and the fiber exits the chamber to fiber outlet conduit 54.

Figure 3:
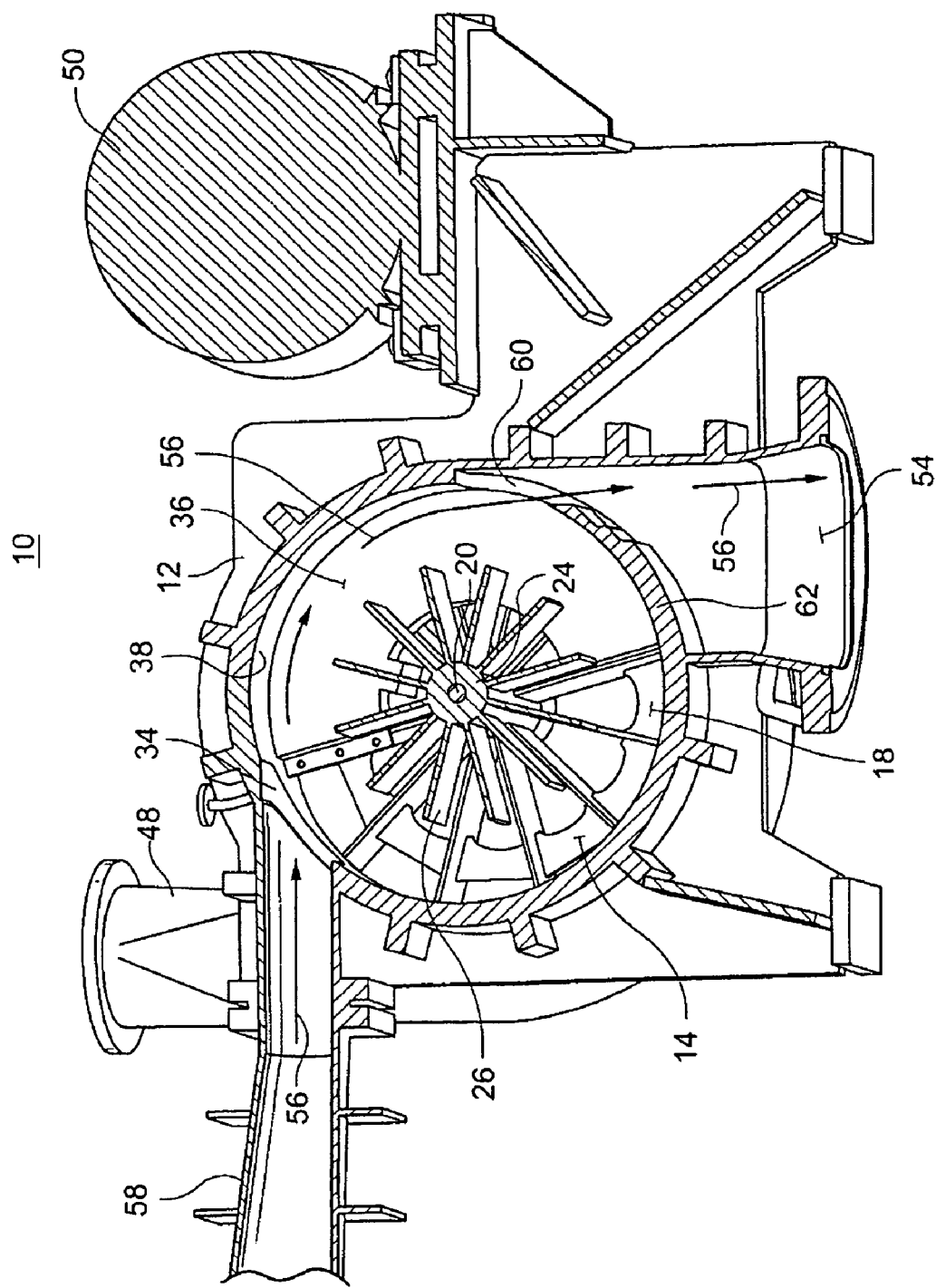
FIG. 3 is a cross-sectional diagram showing another view of the fiber-steam centrifuge.

FIG. 3 is a side view, shown partially in cross-section, of the fiber-steam centrifuge 10. The flow path 56 of the fiber through the centrifuge is shown by the arrows passing through the inlet conduit 58 for the fiber and steam flow. As the flow passes through the inlet port 34, the flow is forced through the first cylindrical chamber 14 by the momentum from the inlet velocity of the flow and the rotational flow generated in the chamber by the rotating rotor assembly 24 and its corresponding rotor blades 26.

The flow turns in the first cylindrical chamber 14 due to the generally circular perimeter of the chamber (see inside wall 38). The flow turns from the direction, e.g., horizontal, as the flow passes through the inlet port 34 to the direction, e.g., vertical, of flow at the outlet port 60 and into the outlet conduit 54. The amount of turning, e.g., 90 degrees, of the flow in the first cylindrical chamber should be sufficient to allow the fibers in the flow to be forced to towards the inside perimeter wall 38 of the first cylindrical chamber and to allow the steam to be drawn into the opening 40 and thereby separated from the fibers.

Preferably, the outlet port 60 for the fiber flow is a slot opening in the inside perimeter wall 38. The dimensions of the opening of the outlet 60 may be selected to allow the fibers moving along the perimeter wall 38 to flow out of the chamber 14 without unnecessarily venting excessive amounts of gas from the chamber. As shown in FIG. 3, the outlet 60 is a relatively small area outlet having an area and shape equivalent to the inlet opening 34 shown in FIG. 1. The fiber outlet 60 opens directly to the fiber outlet conduit 54. The cross-sectional area of this conduit 54 may be substantially greater than the area of the fiber outlet 60 as is evident from the portion 62 of the inside wall 38 at the perimeter of the first cylindrical chamber 14.

Figure 4:
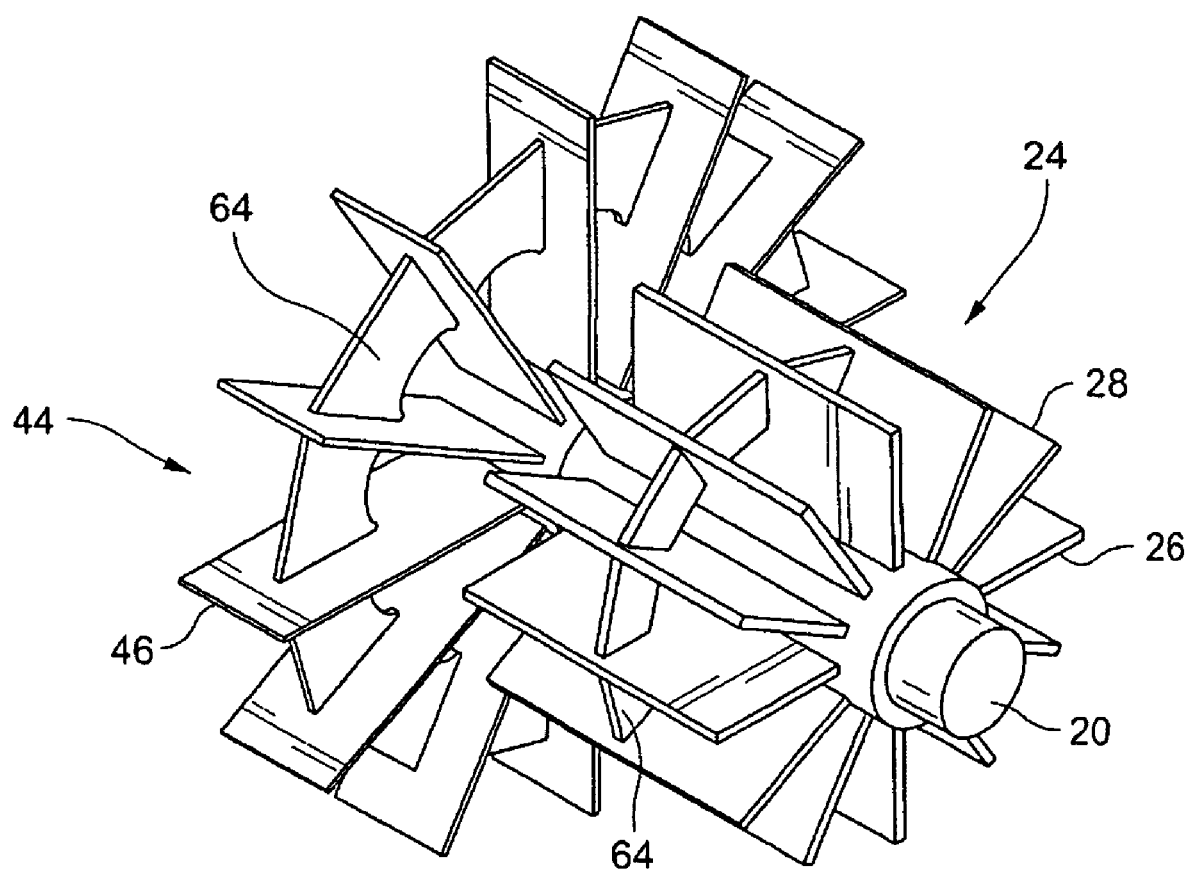
FIG. 4 is a perspective view of a rotor assembly, fan and shaft for the fiber-steam centrifuge.

FIG. 4 is a perspective view of the rotor assembly 24 showing the rotor blades 26, the fan 44 and fan blades, and the shaft assembly 20. The rotor assembly 24 and fan 44 are coaxially mounted side-by-side on the shaft assembly 20, such as by welding. A ring support 64 may be included with each of the arrays of rotor blades and fan blades. The ring support provides structural rigidity and support to the blades, and assists in maintaining the in a proper radial alignment.

The fiber steam centrifugal separator 10 is not limited to separating fibers from steam. The separator disclosed herein is an exemplary embodiment of a separator useful for separating particulates entrained in a gas stream, and particularly a gaseous steam. The separator has several advantages including an ability to separate particulates from a stream without directly contacting the particulates. The separator may by applied to separate particulates that might be damaged by contact with rotor blades or other mechanical moving components.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A separator for separating particulates from a gas stream, the separator comprising:
   a housing including a first chamber defining a curved flow path for the gas stream passing through the separator, wherein the first chamber has an inlet for the gas stream which is substantially tangent to the curved flow path;
   a rotor assembly in the first chamber;
   the chamber including an outer zone having an inner circumferential side adjacent an outer radius of the rotor assembly and an outer circumferential side defined by an inside surface of the chamber;
   a flow inlet port to the first chamber and a fiber outlet port from the first chamber, wherein the inlet port and outlet port are each aligned with the outer zone of the first chamber, and
   a second chamber coupled to the first chamber by a gas passage, wherein an opening to the gas passage in the first chamber is radially inward of the outer radial zone.

2. The separator of claim 1 wherein the rotor assembly includes rotor blades and the tips of the rotor blades are adjacent the inner circumferential side of the outer zone.

3. The separator of claim 1 wherein the outer radial zone defines a flow passage between the flow inlet port and the fiber outlet port that is substantially free of moving mechanical components.

4. The separator of claim 1 wherein the first chamber is a cylindrical chamber and the second chamber is a cylindrical chamber, wherein the first chamber is adjacent the second chamber and the chambers are separated by a dividing wall.

5. The separator of claim 4 wherein the gas passage is an aperture in the dividing wall.

6. The separator of claim 1 wherein the rotor assembly includes rotor blades extending substantially an entire width of the first chamber.

7. A separator for separating particulates from a gas stream, the separator comprising:
   a housing including a first chamber defining a curved flow path for the gas stream passing through the separator and a second chamber, wherein the first chamber is adjacent the second chamber and the chambers are separated by a dividing wall;
   a rotor assembly in the first chamber;
   the first chamber having an outer radial zone, wherein the outer radial zone extends radially between the rotor assembly and an inside surface of the first chamber;
   a flow inlet port to the first chamber and a fiber outlet port from the first chamber, wherein the inlet port and outlet port are each aligned with the outer radial zone of the first chamber and the inlet port is substantially tangent to curved flow path, and
   the second chamber is in fluid communication with the first chamber by a gas passage, wherein an opening to the gas passage in the first chamber is radially inward of the outer radial zone.

8. The separator of claim 7 wherein the rotor assembly includes rotor blades extending no more than one half of a radial dimension of the first chamber.

9. The separator of claim 7 wherein the rotor assembly includes rotor blades and tips of the rotor blades extend to an inner radial side of the outer zone.

10. The separator of claim 7 wherein the outer zone defines a flow passage between the flow inlet port and the fiber outlet port that is substantially free of moving mechanical components.

11. The separator of claim 7 wherein the rotor assembly includes rotor blades extending substantially an entire width of the first chamber.

12. A separator for separating particulates from a gas stream, the separator comprising:
   a housing including a first chamber defining a curved flow path for the gas stream passing through the separator and a second chamber, wherein the first chamber is adjacent the second chamber and the chambers are separated by a dividing wall;
   a rotor assembly in the first chamber, wherein the rotor assembly has rotor blades;
   the first chamber having an outer radial zone, wherein the outer radial zone extends radially between the rotor assembly and an inside surface of the first chamber;
   a flow inlet port to the first chamber and a fiber outlet port from the first chamber, wherein the inlet port and outlet port are each aligned with the outer radial zone of the first chamber;
   the second chamber is in fluid communication with the first chamber by a gas passage, wherein an opening to the gas passage in the first cylindrical chamber is radially inward of the outer radial zone, and
   a fan in the second chamber reducing a pressure in the second chamber as compared to a pressure in the first cylindrical chamber, wherein the fan includes fan blades extending radially outward beyond the rotor blades of the rotor assembly.

13. The separator of claim 12 further comprising a shaft in the housing, wherein the rotor assembly and fan are coaxially mounted on the shaft.

14. A separator for separating particulates from a gas stream, the separator comprising:

a housing including a first chamber defining a curved flow path for the gas stream passing through the separator and a second chamber, wherein the first chamber is adjacent the second chamber and the chambers are separated by a dividing wall;

a rotor assembly in the first chamber, wherein the rotor assembly has rotor blades;

the first chamber having an outer radial zone, wherein the outer radial zone extends radially between the rotor assembly and an inside surface of the first chamber;

a flow inlet port to the first chamber and a fiber outlet port from the first chamber, wherein the inlet port and outlet port are each aligned with the outer radial zone of the first chamber, wherein the flow inlet port and the fiber outlet port are tangent to the inside surface of the first chamber, and the second chamber is in fluid communication with the first chamber by a gas passage, wherein an opening to the gas passage in the first cylindrical chamber is radially inward of the outer radial zone.

15. The separator of claim 14 wherein the flow inlet port is offset by at least ninety degrees from the fiber outlet port with respect to the first cylindrical chamber.

16. A method to separate particles from a gas stream, using a separator including a first chamber defining a curved flow path for the gas stream passing through the separator and a second chamber, wherein the first chamber is adjacent the second chamber, the method comprising:

introducing the gas stream to an outer zone of the first chamber, wherein the introduction of the gas stream to the outer zone includes the gas stream moving along a path generally tangent to the outer zone;

generating a rotational gas flow in the first chamber with a rotor assembly in the first chamber, wherein the rotor assembly has an outer radial edge radially inward of the outer zone of the first chamber;

applying the rotational flow to move the gas stream through the outer zone and to applying centrifugal force to the particles in the gas stream to an outer radial periphery of the outer zone;

discharging the fibers from the gas stream through a fiber outlet port in a perimeter wall of the first chamber;

sucking gas from the gas stream from the outer zone into an opening in the first chamber, wherein the opening is radially inward of the outer zone.

17. The method of claim 16 wherein the opening leads to a second chamber at a lower pressure than the first chamber, and the suction of the gas is due to a pressure difference between the first chamber and the second chamber.

18. The method of claim 16 wherein the particles flow through the outer zone without impacting a moving mechanical component of the separator.

19. The method of any of claim 16 wherein the gas stream includes steam and the particles include wood fibers.

* * * * *